(12) United States Patent
Tipping et al.

(10) Patent No.: US 8,393,944 B2
(45) Date of Patent: *Mar. 12, 2013

(54) RACING LINE OPTIMIZATION

(75) Inventors: Michael E. Tipping, Girton (GB); Mark Andrew Hatton, Eye (GB); Ralf Herbrich, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 149 days.

This patent is subject to a terminal disclaimer.

(21) Appl. No.: 13/006,263

(22) Filed: Jan. 13, 2011

(65) Prior Publication Data

US 2011/0137629 A1   Jun. 9, 2011

Related U.S. Application Data

(63) Continuation of application No. 11/322,527, filed on Dec. 30, 2005, now Pat. No. 7,892,078.

(51) Int. Cl.
*A63F 13/00* (2006.01)
(52) U.S. Cl. .................. 463/7; 463/1; 463/6; 463/23
(58) Field of Classification Search ............ 463/6–7; 703/8
See application file for complete search history.

(56) References Cited

U.S. PATENT DOCUMENTS

| 6,117,007 A | 9/2000 | Matsuyama et al. |
|---|---|---|
| 6,420,997 B1 | 7/2002 | Cong |
| 2003/0109296 A1 | 6/2003 | Leach et al. |
| 2004/0263693 A1 | 12/2004 | Herbrich et al. |
| 2006/0074535 A1 | 4/2006 | Gim et al. |

OTHER PUBLICATIONS

John Manslow, "Fast and Efficient Approximation of Racing Lines", 2004, AI Game Programming Wisdom 2, pp. 485-488.
Brian Beckman, "The Physics of Racing, Part 5: Introduction of the Racing Line", 1991, <http://phors.locost7.info/phors05.htm>.

*Primary Examiner* — Ronald Laneau
*Assistant Examiner* — Justin Myhr
(74) *Attorney, Agent, or Firm* — Alleman Hall McCoy Russell & Tuttle LLP

(57) ABSTRACT

An automatic algorithm for finding racing lines via computerized minimization of a measure of the curvature of a racing line is derived. Maximum sustainable speed of a car on a track is shown to be inversely proportional to the curvature of the line it is attempting to follow. Low curvature allows for higher speed given that a car has some maximum lateral traction when cornering. The racing line can also be constrained, or "pinned," at arbitrary points on the track. Pinning may be performed randomly, deterministically, or manually and allows, for example, a line designer to pin the line at any chosen points on the track, such that when the automatic algorithm is run, it will produce the smoothest line that still passes through all the specified pins.

26 Claims, 7 Drawing Sheets

RACING LINE OPTIMIZATION

CROSS-REFERENCE TO RELATED APPLICATION(S)

This application is a continuation of and claims the benefit of U.S. patent application Ser. No. 11/322,527, filed Dec. 30, 2005, titled RACING LINE OPTIMIZATION, which is incorporated herein by reference.

BACKGROUND

For a car to drive around a race track in a competitively quick time, it must sustain as high a speed as possible at all points on the track. Given the fixed characteristics of the car, driving at high speed is principally facilitated by driving as smooth a line as possible within the bounds of the track surface. This subjective line is often called the "racing line".

Such a racing line may be well estimated by a skilled driver. An obvious approach would be via experimental practice on the track in question. Alternatively, an approximate line could be drawn by study of a diagram of the track.

In racing video games, such as on a desktop computer, video game console, or other system, a player typically maneuvers a racer along a track in a virtual environment. Exemplary racers may include race cars or other vehicles, player avatars, and other racing entities. Furthermore, racing typically includes a competitive characteristic, for example, racing for speed or accuracy (e.g., through gates), jumping for distance, racing with fuel conservation goals, and dog-fighting. Additionally, a racer may be challenged by other competitors, either actual players, or an artificial competitor generated by the computer operating under an artificial intelligence (AI) program. Such competitive characteristics can challenge the player in controlling the racer along a path, such as a race track or other route.

There are certain scenarios, such as the design of a driving simulation in a video game, where it may be necessary to estimate racing lines for many tracks (perhaps hundreds in the case of a video game that allows players to select among multiple particular tracks to race) or different racers (e.g., a Volkswagen Beetle versus a Formula One racer). Racing lines are followed by AI racers when a player is competing against the computer system rather than other players. It may be necessary to design several lines per track for AI racers for various reasons (e.g., for variety and to allow overtaking).

A racing line may be determined statically from data storage or computed dynamically, both on a track by track basis. For example, each track may be associated with its own suggested driving line, which is retrieved from data storage and applied to the track selected for the race. Racing lines may be manually determined or "drawn" by a developer. Alternatively, a racing line may be individually computed using geometric techniques for different tracks. Design of multiple racing lines is clearly a time-consuming, labor-intensive, and potentially error-prone task.

SUMMARY

Implementations described and claimed herein address the foregoing situations by automatically estimating racing lines for an arbitrary track (either "circuit" or "point to point"), based on a minimally sufficient geometric description of the drivable track area. To a first approximation, mathematically speaking, a "smooth racing line" is essentially a line which exhibits low geometric curvature while remaining on the race track. Low curvature is beneficial for speed since in a corner, given that a car has some maximum lateral traction ability, its maximum sustainable speed can be shown to be inversely proportional to the curvature of the line it is attempting to follow. Based upon this relationship, and using a number of educated approximations, an automatic algorithm for finding racing lines via computerized minimization of a measure of the a line's curvature may be derived. This line is not necessarily the absolute "best" line from a racing criterion, but subjectively it appears very close to what might be judged the best line.

An additional feature of this system is that while the entire racing line can be automatically generated, the line can also be constrained, or "pinned," at arbitrary points on the track. This may be done automatically (both randomly and deterministically) or manually and allows, for example, a line designer to pin the line at any chosen points on the track, such that when the automatic algorithm is run, it will produce the smoothest line that still passes through all the specified pins. In this way, the designer may choose to override the automatic system wherever desired in order to efficiently create an improved or alternative racing line.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

BRIEF DESCRIPTIONS OF THE DRAWINGS

DETAILED DESCRIPTION

Figure 1:
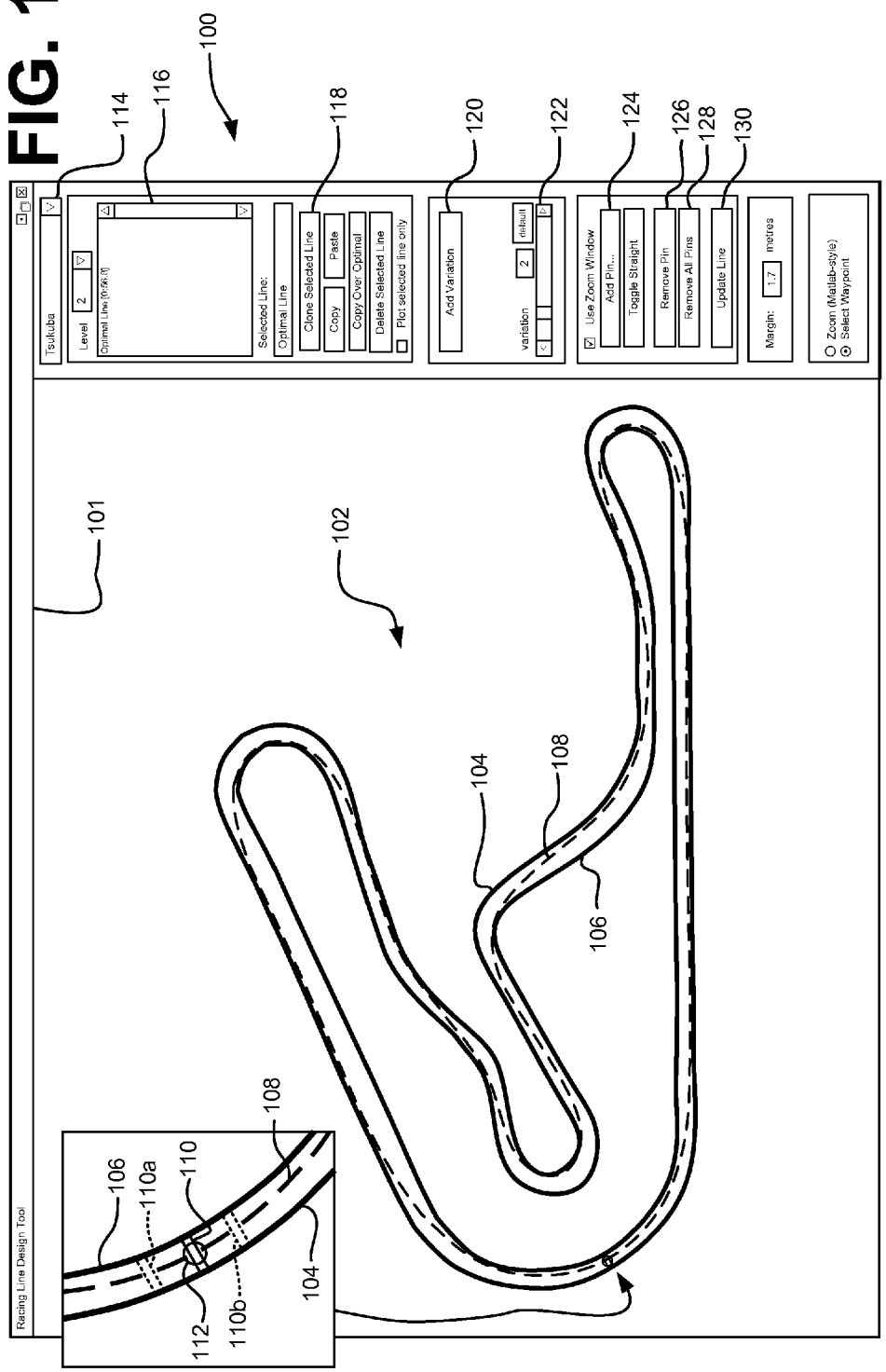
FIG. 1 illustrates a screenshot portion from an exemplary development tool for developing racing lines.

This discussion considers the problem of specifying realistic racing lines for simulated vehicles in computer programs. Although described in exemplary implementations herein primarily with respect to computer simulations for the purpose of designing more realistic race car driving video games, nothing in the system precludes more general applicability to real-world vehicle control systems. Further, it should be understood that a racing line may include any path along which a game entity may be controlled, for example, by a user or the game's artificial intelligence engine, and is not limited to automobile or other driven vehicle game contexts. As such, a player controlling a running or flying character in a video game may follow a racing line, outside of a vehicle context.

A prototypical such program might be an auto racing video game in which a player races against a number of opponent cars, whose behavior is simulated by a "physics" system in conjunction with an "artificial intelligence" (AI) system. A driving design goal behind many computer racing games is to make the experience as realistic as possible for the player. To this end, players have the ability to choose between a large number of cars and race tracks. In many cases, these car and track choices are emulative of actual race cars and actual race tracks from around the world. When a player races against other players, the physics system is programmed to create realistic responses to user input. When a player races against computer controlled opponents, the physics system and AI system are programmed to create realistic opposition.

The physics engine module in the video game simulates the physical forces within the video game, including gravitational forces, frictional forces, collision effects, mechanical problems, track conditions, etc. Racer properties can be input to the physics engine module to compute the maximum sustainable lateral acceleration force (e.g., how capably the racer can corner), the maximum sustainable longitudinal deceleration (e.g., how capably the racer can brake), and the maximum straight line velocity (collectively, "racer limits"). Each of these properties may be obtained from the physics engine, which simulates the game action based on a broad assortment of environmental parameters and other inputs. It should be understood that such racer properties may change during game play, such as if the racer is damaged during a race.

Generally, a racing line is computed geometrically without regard to track physics (e.g., friction, geometry, and surface conditions), racer characteristics (e.g., weight, grip and steering), environmental conditions (e.g., temperature, humidity, wind, daylight, and artificial light), and other racers, although these features may also be taken into consideration. During a competitive race scenario, however, a racer may be forced to corner early or late (i.e., to block a passing competitor or to execute a pass of a competitor), or to change speed position depending on track conditions and the interaction with other racers. As such, although an optimal racing line may be preferred, in the context of a competitive race departures from the optimal racing line at numerous points during the race are a reality. Thus, for a more realistic experience, the racing lines for AI competitor cars should similarly vary according to the track conditions.

To specify the vehicle behaviour, the AI system will typically decompose the overall behaviour specification task into several sub-tasks, for example, determination of the speed a car should follow and determination of control of the car through steering, acceleration, and braking based upon parameters specific to, for example, the type of race car, the design of the track, and the track conditions. An additional behavior determined by the AI system may be specification of a route or "racing line"—a sequence of positions in the simulated world that the car is desired to follow.

In one implementation, a racing line may be generated using a design tool application 100 on a computer system. FIG. 1 depicts an exemplary computer interface for a design tool 100 for creating racing lines. The design tool 100 generates the multiple lines needed for the artificial intelligence (AI) system to control the behaviour of the competitor cars in the game. The design tool 100 allows a designer to easily generate racing lines for all the tracks available for selection by a player of a video game. The design tool can be particularly time-saving when providing player a choice of many (e.g., 100) tracks and in the case of the bigger circuits (e.g., some tracks are over 15 miles long). The design tool 100 may initially be used to automatically generate a racing line around a particular track. If the designer is not happy with the line at all places on the track, then the design tool 100 allows the designer to "pin" the racing line manually at any given point. An optimization routine will then find the smoothest racing line subject to the constraint that it must pass through all the pins.

FIG. 1 depicts an exemplary race track 102 within a design window 101 of the design tool 100. The race track 102 is defined by an outside edge 104 and an inside edge 106. A racing line 108 generated automatically by the design tool 100 is depicted along the race track 102 within the bounds of the outer edge 104 and the inner edge 106. A section of a corner turn along the left edge of the race track 102 is enlarged in the box at the upper left of FIG. 1 for ease of viewing the elements in that area.

A series of waypoints 110, 110a, 110b is depicted along the race track 102. The waypoints 110, 110a, 110b are automatically generated segmentation points along the length of the race track 102. In one implementation, the waypoints 110, 110a, 110b may be spaced 2 meters apart along the center line of the length of the race track 102. The waypoints 110, 110a, 110b span the width of the race track 102 between the outer edge 104 and the inner edge 106 and are oriented normal to a center line (not shown) of the race track 102.

A pin 112 is placed at one of the waypoints 110, forcing the racing line 108 to pass through the pin 112 rather than close to the inside edge 106 of the race track 102, which would be a more optimal racing line. In this manner, the racing line 108 has been made deliberately wider by placing the pin 112 further from the inside edge 106 from the bend on the left-hand side of the race track 102 than potentially optimal.

The design tool 100 allows a designer to design racing lines on any of a variety of predetermined tracks accessible from a "Track Selection" menu 114. Once a track is selected, a new racing line may be computed by the design tool 100. In one instance, the new racing line may be based on a previously constructed racing line upon selection of a previously computed base line from a list in a line selection box 116. If a designer desires to keep the optimal line as one racing line option, but additionally wants to create alternative racing lines based upon the optimal line (or any other previously created line presently selected), the designer may select the "Clone Selected Line" command 118. Using this command creates a copy of the desired base line that the designer can manipulate as desired to create an alternative racing line.

The design tool 100 also allows the designer to create additional variations (e.g., for the purposes of realistic driving) on a base line by selecting an appropriate amount of "variation" and selecting the "Add Variation" command 120. A variation amount may be manually determined and entered or the system may automatically add small random (e.g., Gaussian) perturbations to the existing line at all corner entry and exit points. The magnitude (variance) of these random perturbations is controlled by the "Variation" slider command 122. These perturbations are then imposed as "pins" and the optimization proceeds subject to those constraints to automatically generate a realistic alternative racing line.

For example, in a video game implementation, each AI controlled competitor driver has more than one line that it follows around the track. Multiple racing lines are then followed by an AI competitor to introduce a realistic level of variety into the AI competitor's driving. These additional racing lines may be generated automatically with the variation commands by randomly sampling an offset from a pre-optimized base line at chosen places (e.g. at the entry, exit and apex of corners), using those offsets to automatically place pins, and then re-optimizing the racing line with those constraints.

Figure 2:
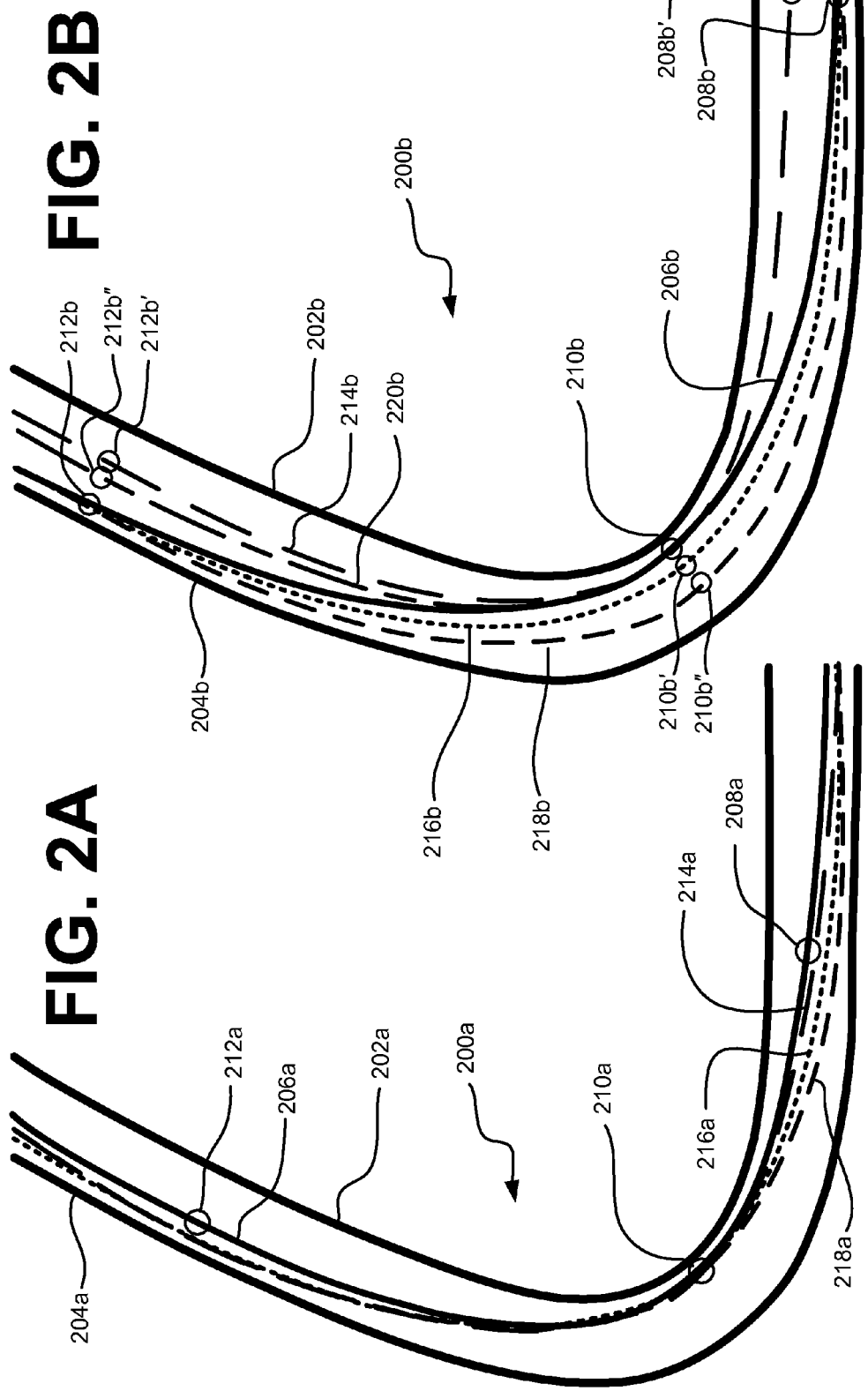
FIG. 2A is a schematic diagram illustrating racing lines generated by random perturbation from an optimal line.
FIG. 2B is a schematic diagram illustrating racing lines generated deterministically by placement of pin points apart from an optimal line.

FIG. 2A depicts exemplary racing lines generated by such a random variation process. A portion of a race track 200a is defined by an inner edge 202a and an outer edge 204a. An optimal racing line 206a has been defined, which for ease of reference passes through a corner entry pin point 208a, an apex pin point 210a, and a corner exit pin point 212a. Three additional racing lines 214a, 216a, and 218a are shown generated by random perturbation of the optimal racing line 206a about the corner entry pin point 208a and the corner exit pin point 212a. Each of the additional racing lines 214a, 216a, and 218a generated by random variation of the optimal racing line 206a is constrained by the apex pin 210a of the optimal racing line 206a and is forced to pass through that point.

Returning to FIG. 1, a designer may manually place pins on a racing line using the "Add Pin . . . " command 124. This command allows a designer to locate pins at any desired point along a racing line. Individual pins may be removed when selected on the racing line by further selecting the "Remove Pin" command 126. All pins placed on a particular racing line may be removed at once by selecting the "Remove All Pins" command 128. Once desired pins are placed, the "Update Line" command 130 may be selected to recalculate the racing line to optimally travel through each of the pins around the race track 102. The Update Line command 130 may also be used to generate an initial optimal racing line based upon track geometry alone.

In an alternative implementation, not depicted in the design tool application interface of FIG. 1, a racing line design system may deterministically process an existing line to generate new lines with various fixed offsets at particular places. These new racing lines are used as optional alternatives for the AI system to switch to for example, for blocking tactics and for overtaking another car. Standard options for alternative lines may be set, which may include, for example, racing lines that are constrained to be 2 or 4 meters tighter than the base line entering a corner, or 3 meters wider at the apex, or other similar constraints. All these lines are generated automatically by adding appropriate fixed pin offsets to a pre-optimized base line and then re-optimizing the racing line. In this case, fixed (rather than random) pins are automatically placed in relevant places and an optimization of the racing line is then performed.

One exemplary implementation of deterministically designing racing lines from an initial line is depicted in FIG. 2B. A portion of a race track 200b is defined by an inner edge 202b and an outer edge 204b. An optimal racing line 206b has been defined, which for ease of reference passes through a corner entry pin point 208b, an apex pin point 210b, and a corner exit pin point 212b.

Four additional racing lines are shown generated by the deterministic system. A first line 214b is positioned six meters tighter at the corner entry, as indicated by the alternative corner entry pin 208b'. The first line 214b is constrained by the apex pin 210b of the optimal racing line 206b, but exits the turn through a first alternate corner exit point 212b' six meters tighter than the exit corner pin point 212b.

A second line 216b enters the turn at the corner entry pin point 208b of the optimal racing line 206b, but is constrained by a first alternative apex pin 210b' that is three meters wider than the apex pin point 210b. The second line returns to the path of the optimal racing line at the corner exit pin point 212b.

A third line 218b enters the turn at the corner entry pin point 208b of the optimal racing line 206b, but is constrained by a second alternative apex pin 210b'' that is six meters wider than the apex pin point 210b. The second line returns to the path of the optimal racing line at the corner exit pin point 212b.

A fourth line 220b enters the turn at the corner entry pin point 208b of the optimal racing line 206b and is also constrained by the apex pin point 210b of the optimal racing line. However, the fourth line 220b exits the turn through a second alternate corner exit point 212b'' four meters tighter than the exit corner pin point 212b. Thus the use of deterministic pin points for each turn on a track can help quickly create a number of alternative racing lines useful for realistic AI system control of racers competing against a player.

In one implementation, a design tool application for determining optimal racing lines along a track, and further for optimizing racing lines constrained to travel through particular points around the track, may mathematically characterize and create such racing lines using the following analysis and operations. Assume that some line on the track, which may be static (e.g., the centerline) or dynamic (e.g., the line taken by a car) is specified by a sequence of (x, y) positions, which are parameterized by the distance along the line s:

$$x = x(s) \tag{1}$$

$$y = y(s), \tag{2}$$

where s is a specific point along the racing line. For simplicity, lines in the horizontal plane only are considered and height information is ignored. Now the "direction" of the line is conventionally given by the angle θ between the tangent to the line and the x-axis:

$$\tan\theta = \frac{dy}{dx} \tag{3}$$

$$= \frac{dy/ds}{dx/ds} \tag{4}$$

$$= \frac{\dot{y}}{\dot{x}}, \tag{5}$$

where the "dot" notation "$\dot{x}$" is used as a shorthand to indicate differentiation with respect to s.

"Curvature" σ of the line is defined as the rate of change of angular direction with respect to s:

$$\sigma(s) = \frac{d\theta}{ds} \tag{6}$$

$$= \frac{d}{ds}\tan^{-1}\left(\frac{\dot{y}}{\dot{x}}\right) \tag{7}$$

$$= \frac{1}{1 + (\dot{y}/\dot{x})^2} \frac{d}{ds}(\dot{y}/\dot{x}) \tag{8}$$

$$= \frac{1}{1 + (\dot{y}/\dot{x})^2} \left[\frac{\ddot{y}\dot{x} - \ddot{x}\dot{y}}{\dot{x}^2}\right] \tag{9}$$

$$= \frac{\ddot{y}\dot{x} - \ddot{x}\dot{y}}{(\dot{x})^2 + (\dot{y})^2} \tag{10}$$

$$= \ddot{y}\dot{x} - \ddot{x}\dot{y} \tag{11}$$

since $(\dot{x})^2 + (\dot{y})^2 = 1$, as a result of $dx^2 + dy^2 = ds^2$. Note that the "radius of curvature" ρ(s) (the radius of the circle that touches the line at s with identical curvature) is simply given by ρ(s)≡1/|σ(s)|, and it is this quantity that is most directly relevant to driving a car around a track.

It follows from the laws of physics that in order to successfully follow a line with radius of curvature σ(s) at a point s, a body of mass m traveling with speed v(s) must experience a force orthogonal to the tangent at s of magnitude $$F = \frac{mv(s)^2}{\rho(s)} = mv(s)^2|\sigma(s)|. \quad (12)$$

In the case of a car traveling around a bend, a simplistic analysis considers that the car can sustain, via frictional force between tires and pavement, a maximum lateral force $F_{max}$ (i.e., a force orthogonal to the heading of the car and, under normal circumstances, the tangent to the line of travel) before it loses grip and skids. To avoid skidding, from equation (12), the car's speed at s must therefore be constrained:

$$v(s) \le \sqrt{\frac{F_{max}}{m|\sigma(s)|}} \quad (13)$$

$$= \sqrt{\frac{K_{max}}{|\sigma(s)|}} \quad (14)$$

$$= v_{max}(s), \quad (15)$$

where $K_{max}=F_{max}/m$ is some constant "maximum sustainable lateral acceleration" representing the fact that $F_{max}$ (approximately) and m are fixed. Thus, the speed that the car can safely travel at s can be seen to be maximized by minimizing the curvature $|\sigma(s)|$.

The time for a car to travel the small distance from s to s+δs, assuming that δs is sufficiently small such that the speed over it can be considered constant at v(s), is:

$$\delta t = \frac{\delta s}{v(s)} \quad (16)$$

The total lap time for the car will be the sum of all the times $\delta t_n$ over all the small segments $\delta s_n$ that make up a complete lap:

$$\tau_{lap} = \sum_{s_n} \frac{\delta s_n}{v(s)_n} \quad (17)$$

and we take as the limit $\delta s_n \to 0$ for all n:

$$\tau_{lap} = \int_{lap} \frac{1}{v(s)} ds. \quad (18)$$

If we desire the car not to exceed $v_{max}$ at all s, then:

$$\tau_{lap} \ge \frac{1}{\sqrt{K_{max}}} \int_{lap} \sqrt{|\sigma(s)|}\, ds. \quad (19)$$

Therefore, in the best of all possible worlds, we could minimize the optimally attainable lap time by minimizing the function:

$$E[\sigma] = \int_{lap} \sqrt{|\sigma(s)|}\, ds \quad (20)$$

with respect to x(s) and y(s).

Of course, $\tau_{lap}$ can only be a lower bound on the true lap time. The curvature function σ(s) that attains the minimal E[σ] implies a corresponding optimal speed function v(s) which may not be attainable by the car. For example, it may require a sudden change in speed over some small distance δs that the car has not the physical braking or acceleration capacity to achieve. In addition, it implies that if curvature is zero at any point (e.g., a straight), then $v_{max}=\infty$, which is obviously impossible to achieve.

Although this does represent rather an idealized scenario, we nevertheless might reasonably expect that any procedure that minimizes equation (20), or an approximating measure of similar character, would lead to a reasonably decent racing line. As a step towards reaching such an approximation, the idealized curvature function σ(s) needs to be usefully computed. In practice, it may be impractical to compute a curvature function σ(s), but we typically specify lines in terms of consecutive positions at N discrete waypoint locations ($x_n$, $y_n$). So one simple numerical approximation to the curvature error criterion of equation (20) would be:

$$E(\sigma) = \sum_{n=1}^{N} |\sigma_n|^{\frac{1}{2}} \quad (21)$$

where $\sigma_n$ is the curvature evaluated at waypoint n, which from equation (11) would be $$\sigma_n = \ddot{y}_n \dot{x}_n - \ddot{x}_n \dot{y}_n. \quad (22)$$

Figure 3:
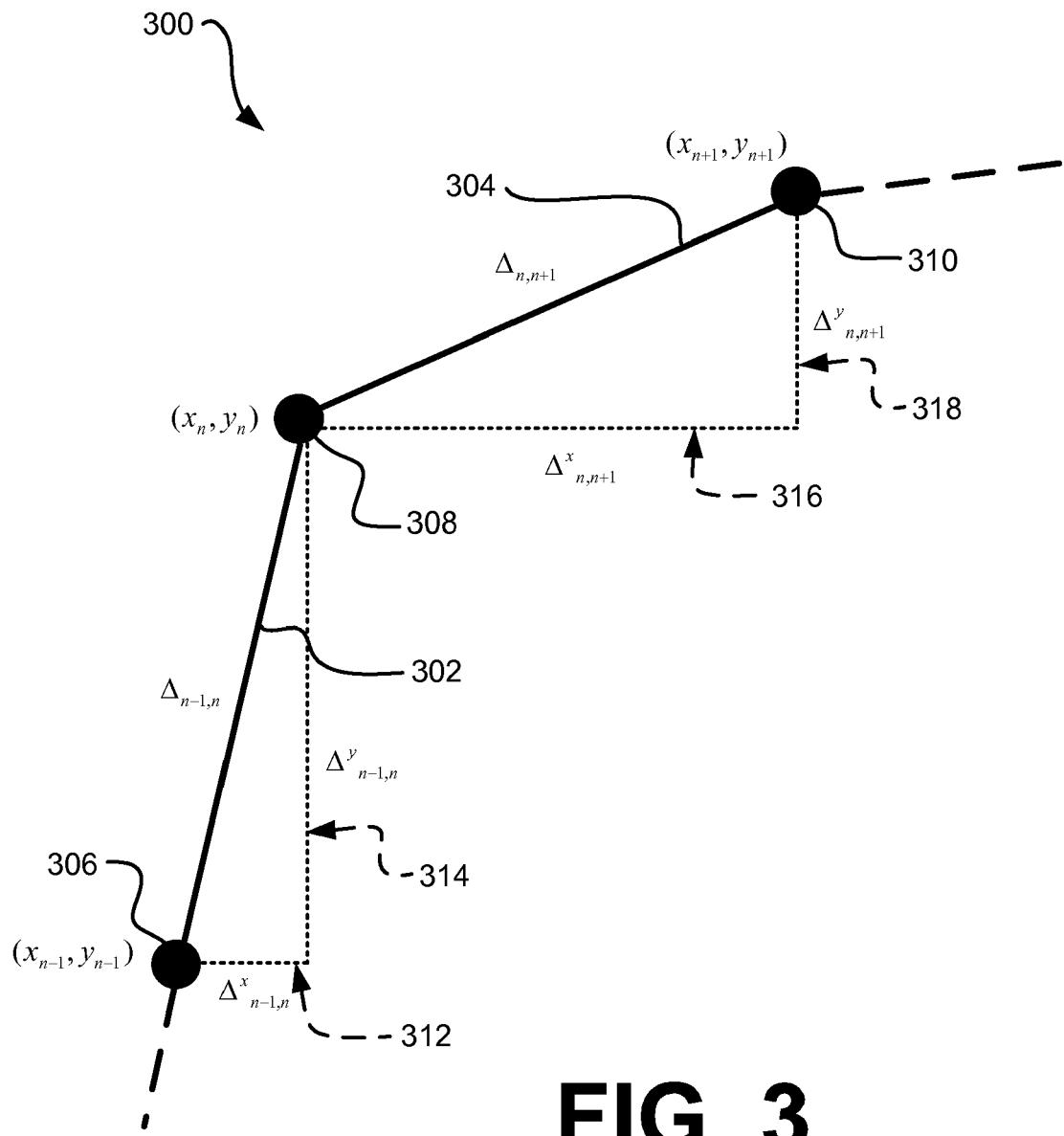
FIG. 3 is a schematic diagram illustrating a geometric and mathematical basis for determining the curvature of a racing line.

In practice, it is also likely impractical to design or compute the functions x(s) and y(s) either. Therefore, to evaluate $\sigma_n$ other numerical approximations to their requisite derivatives are needed. In order to obtain these approximations, the following second-order Taylor series expansion for $x_n$ and $y_n$ may suffice:

$$x_{n-1} \approx x_n - \Delta_{n-1,n}\dot{x}_n + \frac{\Delta_{n-1,n}^2}{2}\ddot{x}_n; \quad (23)$$

$$y_{n-1} \approx y_n - \Delta_{n-1,n}\dot{y}_n + \frac{\Delta_{n-1,n}^2}{2}\ddot{y}_n$$

$$x_{n+1} \approx x_n + \Delta_{n+1,n}\dot{x}_n + \frac{\Delta_{n,n+1}^2}{2}\ddot{x}_n; \quad (24)$$

$$y_{n+1} \approx y_n + \Delta_{n+1,n}\dot{y}_n + \frac{\Delta_{n,n+1}^2}{2}\ddot{y}_n,$$

where terms are defined in FIG. 3.

FIG. 3 depicts a three-waypoint subset of a racing line 300. A first segment 302 of the racing line 300 is defined between a first waypoint 306 and a second waypoint 308. Similarly, a second segment 304 of the racing line 300 is defined between the second waypoint 308 and a third waypoint 310. The first waypoint 306 is located in a planar coordinate system at ($x_{n-1}$, $y_{n-1}$); the second waypoint 308 is located at ($x_n$, $y_n$); and the third waypoint is located at ($x_{n+1}$, $y_{n+1}$).

As depicted, the curvature $\sigma_n$ associated with the second waypoint 308 is a function of both the length $\Delta_{n-1,n}$ of the first segment 302 and the length $\Delta_{n,n+1}$ of the second segment 304. The length $\Delta_{n-1,n}$ of the first segment 302 is in turn a function of the changes in both the x-coordinate distance 312, denoted as $\Delta^x_{n-1,n}$, and the y-coordinate distance 314, denoted as $\Delta^y_{n-1,n}$, between the first waypoint 306 and the second waypoint 308. Similarly, the length $\Delta_{n,n+1}$ of the second segment 304 is in turn a function of the changes in both the x-coordinate distance 316, denoted as $\Delta^x_{n,n+1}$, and the y-coordinate distance 318, denoted $\Delta^y_{n,n+1}$, between the second waypoint 308 and the third waypoint 310. Note that in equation (24), $\Delta_{n,n+1}{}^x = x_{n+1} - x_n$ and similarly $\Delta_{n,n+1}{}^y = y_{n+1} - y_n$. Also, note that we define $(\Delta_{n,n+1})^2 \equiv (\Delta_{n,n+1}{}^x)^2 + (\Delta_{n,n+1}{}^y)^2$.

Note that equations (23) and (24) are two linear equations in $\dot{x}$ and $\ddot{x}$, and in $\dot{y}$ and $\ddot{y}$; respectively, which can be solved analytically. The resulting solution is $$\dot{x}_n = \frac{1}{\Delta_{n-1,n} + \Delta_{n,n+1}} \left[ \Delta_{n,n+1} \frac{\Delta^x_{n-1,n}}{\Delta_{n-1,n}} + \Delta_{n-1,n} \frac{\Delta^x_{n,n+1}}{\Delta_{n,n+1}} \right] \quad (25)$$

$$\ddot{x}_n = \frac{2}{\Delta_{n-1,n} + \Delta_{n,n+1}} \left[ \frac{\Delta^x_{n,n+1}}{\Delta_{n,n+1}} - \frac{\Delta^x_{n-1,n}}{\Delta_{n-1,n}} \right], \quad (26)$$

with similar expressions for $\dot{y}$ and $\ddot{y}$, again where quantities are as defined in FIG. 3.

Evaluating equation (22) based on equations (25) and (26) results in a "best" numerical approximation for the curvature $\sigma_n$. For the purposes of practical optimization, the expression for $\sigma_n$ may be over-complicated and may practically benefit from some simplification. Therefore, a simplifying approximation may be made that the distance between each successive $(x_n, y_n)$ point is constant:

$$\Delta_{n-1,n} = \Delta_{n,n+1} = \Delta, \forall n. \quad (27)$$

This approximation is adequate in an exemplary video racing program for a line that follows center waypoints that are all deliberately equally spaced, for example, at $\Delta=2$ meters. For other lines this approximation may not be as accurate, but it is unlikely to be dramatically far off provided the spacing of the waypoints is of the same order of magnitude than the width of the track. Using this approximation, it follows that:

$$\dot{x}_n = \frac{x_{n+1} - x_{n-1}}{2\Delta} \quad (28)$$

and $$\ddot{x}_n = \frac{x_{n+1} - 2x_n + x_{n-1}}{(\Delta)^2}. \quad (29)$$

Thus, $$\sigma_n \approx \frac{(y_{n+1} - 2y_n + y_{n-1})(x_{n+1} - x_{n-1}) - (x_{n+1} - 2x_n + x_{n-1})(y_{n+1} - y_{n-1})}{2\Delta^3}, \quad (30)$$

which is a much simpler expression than can be obtained without approximation. Because constant $\Delta$ was assumed, $\sigma_n$ is likely to underestimate the curvature on the inside of bends (where the true $\Delta$ will be smaller) and overestimate on the outside.

Note that the numerical approximations of equations (28) and (29) are highly sensitive to any "noise" on the (x, y) data sequence. Noise is a problem for any calculation that involves numerical approximation of a derivative quantity. This is likely not an issue in the present implementation when optimizing a line, but it could be relevant elsewhere when measuring the curvature of some fixed data that may be "noisy," e.g., the track centerline.

In an exemplary racing game, position on the track at some given waypoint location is defined in terms of an orthogonal deviation from the centerline:

$$(x_n, y_n) = u_n + \chi_n v_n, \quad (31)$$

where $u_n = (u_x, u_y)_n$ is the fixed location of the centerline at waypoint n, $v_n$ is the fixed normal vector to the centerline at n, whose magnitude $|v_n|$ is equal to the half-width of the track, and $\chi_n$ is the single adjustable parameter. For $(x_n, y_n)$ to lie on the 'drivable' track, $\chi_n \in [-1, 1]$. This parameterization is illustrated in FIG. 4.

Figure 4:
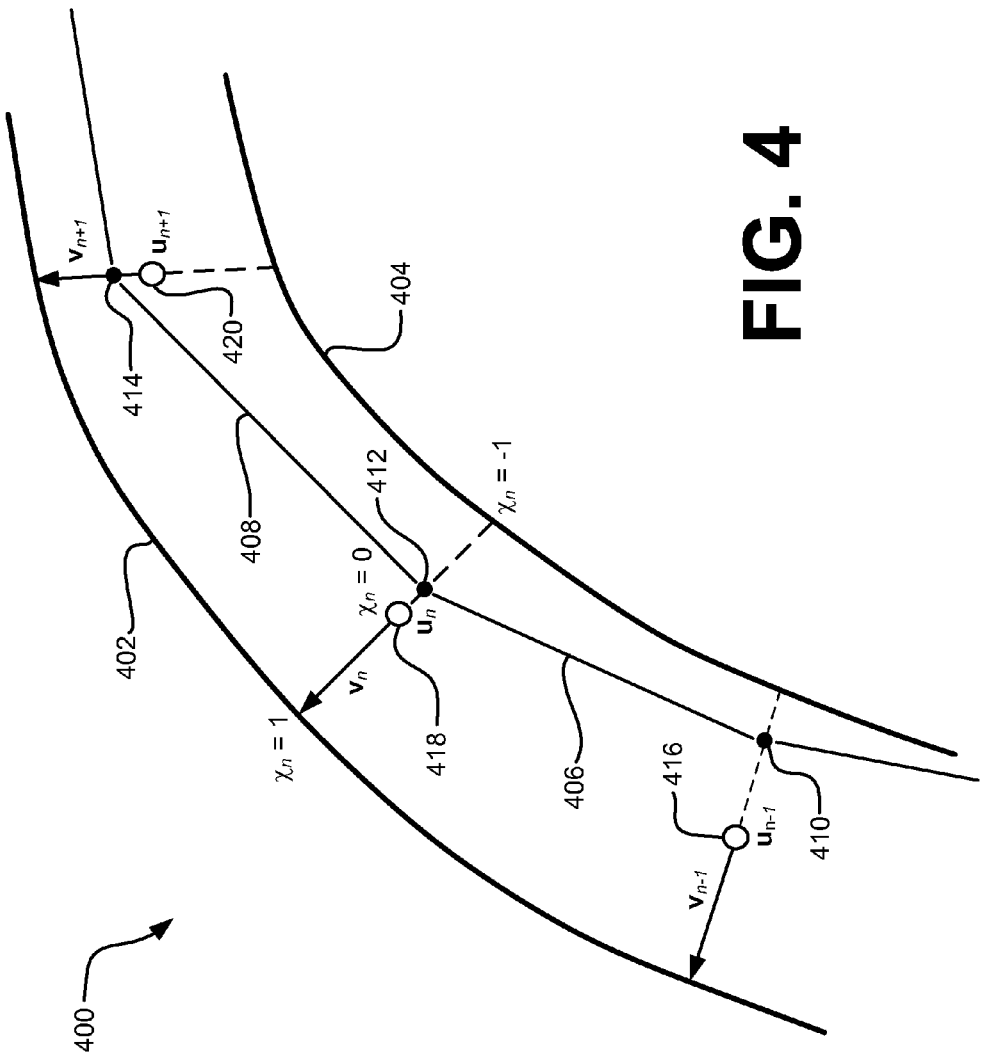
FIG. 4 is a schematic diagram illustrating a geometric and mathematical basis for defining the path of a racing line along a race track.

A three-waypoint subset of a racing line, parameterized in terms of $u_n$, $v_n$, and $\chi_n$, is depicted in FIG. 4. A curved section of track 400 is defined by an outer edge 402 and an inner edge 404. The outer edge 402 of the track 400 is defined to have a unit value from a centerline of the track of 1, represented as $\chi_n = 1$. Similarly, the inner edge 404 of the track 400 is defined to have a unit value from the centerline of the track of $-1$, represented as $\chi_n = -1$. A racing line may be viewed as a series of segments, for example, a first segment 406 and a second segment 408 between the three waypoints along the race track 400. The first segment 406 is bounded by a first position point 410 along a first waypoint and a second position point 412 along a second waypoint. The second segment is similarly bounded by the second position point 412 and a third position point 414 along a third waypoint. Each of the position points could potentially be at any location along a corresponding waypoint.

Three centerpoints are defined by the intersection of the centerline (not shown) and each waypoint. The waypoints may alternatively be viewed as lines between the outer edge 402 and inner edge 404 of the track 400 orthogonal to the centerline at a fixed increment of distance around the track 400. A first centerpoint 416 is defined by the vector $u_{n-1}$; a second centerpoint 418 is defined by the vector $u_n$; and a third centerpoint 420 is defined by the vector $u_{n+1}$. Each of the unit vectors $v_{n-1}$, $v_n$, and $v_{n+1}$ extends from a respective centerpoint 416, 418, 420 orthogonal to the centerline in the direction of the outer edge 402 of the race track 400. Since all $u_n$ and $v_n$ vectors are fixed in advance (by design) for any given track, any racing line can be specified by N scalar parameters $\chi_n$ alone.

This is an ideal representation of the racing line in terms of optimization. We can simply write each $\sigma_n$ as a function of all $\chi$ (strictly speaking, each $\sigma_n$ depends only on $\chi_{n-1}, \chi_n, \chi_{n+1}$) using equations (30) and (31). Then the objective error function becomes:

$$E(\chi) = \sum_{n=1}^{N} |\sigma_n(\chi)|^{1/2} \quad (32)$$

A problem with equation (32) is that the modulus sign makes $E(\chi)$ difficult to minimize by conventional, gradient-based means. In practice, two alternative, and mathematically more convenient, criteria may be used. These criteria are exemplary and other criteria may similarly appropriately fulfill the need.

As a first option, rather than applying the square-root of the modulus, the curvature may be raised to the p-th power:

$$E_p(\chi) = \sum_n [\sigma_n(\chi)]^p, \quad (33)$$

where p is some even power. This still minimizes a measure of total curvature, although not the "true" lap time around. However, there is a serendipitous advantage which arises from using $E_p(\chi)$. With higher values of p, outlying high curvature values become more greatly penalized; in fact, as p→∞, $E_p(\chi)$ penalizes the maximum curvature. It is these very high values that can often require unrealistic magnitudes of acceleration and braking to obtain. So $E_p(\chi)$ may potentially err on the side of producing more physically realizable racing lines.

As a second option, for greater (perhaps maximal) simplicity, one may also use the measure:

$$\hat{E}(\chi) = \sum_n [\hat{\sigma}_n(\chi)]^2, \quad (34)$$

where $$\hat{\sigma}_n(\chi)^2 \approx (\ddot{x}_n)^2 + (\ddot{y}_n)^2. \quad (35)$$

For optimization, one may code the error measures (33), (34), and (35) in a mathematical calculation program (e.g., MATLAB software) as explicit functions of $\chi$, along with their respective derivatives with respect to $\chi$, which are relatively easily calculated. One of a number of available "off-the-shelf" gradient-based optimization algorithms found in a mathematical calculation program may be exploited to iteratively find the minimum value of the criterion of choice. In an exemplary experiment, the "scaled conjugate gradients" routine from the freely-available NETLAB software toolbox was used. Upon termination of the routine, a vector of $\chi_n$ values is returned, which locally minimize (i.e., represent a stationary point of) $E_p(\chi)$ or $\hat{E}(\chi)$.

Experiments with the two different criteria in equations (33) and (34) actually indicated little difference in the subjective quality of results. Therefore, it may be preferred to use the latter $\hat{E}(\chi)$ in equation (34) as this runs noticeably more quickly. In MATLAB software, this procedure takes about 3 seconds for an average-length track with 2000 waypoints.

Figure 5:
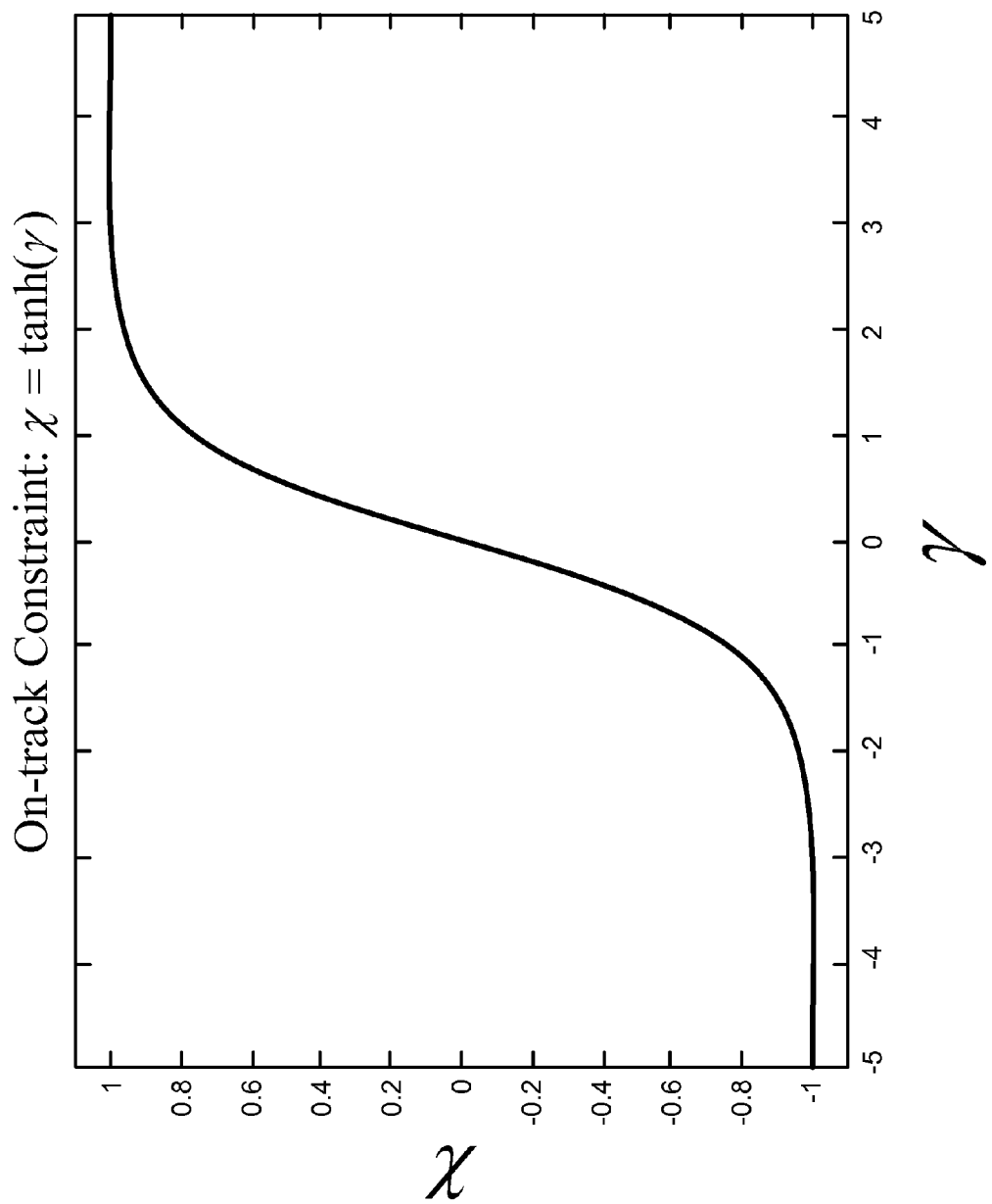
FIG. 5 is a graph illustrating a mathematical function used to constrain the path of a racing line within the bounds of a race track.

If we freely optimize the $\chi_n$ values, then there is nothing to stop them from diverging to some arbitrarily extreme points far away from the track. In fact, if unchecked, this will happen. For the racing line to stay on track, we must ensure that $\chi_n \in [-1,1]$ at all waypoints. This constraint is easily enforced by using a re-parameterization technique that is standard for this type of problem. One can simply define $\chi_n = \tan h(\gamma_n)$, which is a function constrained between the values of $(-1,1)$ for any value of $\gamma_n$ as shown in FIG. 5, and then optimize over the set of parameters $\gamma_n$, simply adjusting the gradient routine appropriately. One may note that any similar differentiable function that maps the real line to −1,+1 could be used here in lieu of tan h. At convergence, $\gamma_n$ values are converted back to $\chi_n$ and the constraint is enforced. The constraint function ensures that $\chi$ is always in the range [−1,1] regardless of the values of the auxiliary variables $\gamma$, which may be freely optimized over the entire real axis.

One feature of this nonlinear optimization approach used is that it is not necessary to optimize the entire set of N values $\chi_n$. Instead, some of these values may be "fixed" during the optimization process, which effectively constrains the racing line at those waypoints to pass through the exact specified location. Running the optimization algorithm thus obtains the smoothest line that still passes through those constrained points. It is quite straightforward to impose such constraints within this framework. The $\chi_n$ (or, in reality, $\gamma_n$) values corresponding to those points identified as 'free' variables are not passed to the nonlinear optimization routine, but nevertheless the routine continues to calculate $\hat{E}(\chi)$ based on all $\chi_n$, both free and fixed. So those fixed points do influence the final result, but are not modified themselves.

Figure 6:
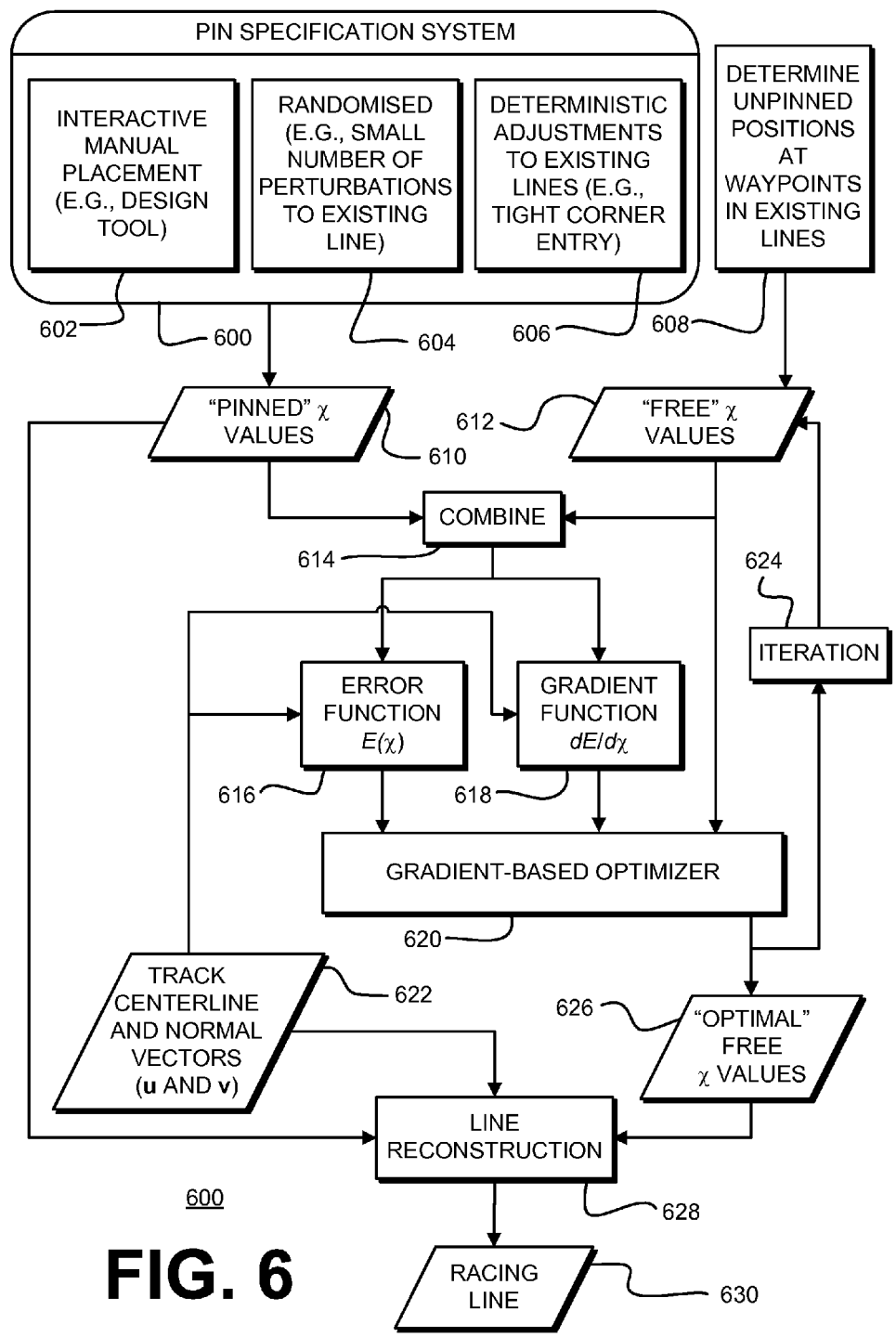
FIG. 6 is a schematic diagram of one implementation of a system for automatically calculating a racing line.

This concept is illustrated in an exemplary implementation for racing line creation and optimization in FIG. 6. Initial parameters are determined in first part by a pin specification system 600. Pin specification may be performed in several ways a previously discussed. In a first operation 602, pins may be placed manually along a racing line using a design tool, for example as described herein with respect to FIG. 1. In a second alternate or co-occurring operation 604, pins may be randomly placed as perturbations to an existing racing line as described with respect to the variation command of the design tool of FIG. 1. In a third alternate or co-occurring operation 606, pins may be placed deterministically as pre-selected adjustments to existing lines as previously described herein.

In addition to the pinned values of a desired racing line, initial "free" values for a base racing line, i.e., positional information for unpinned waypoints of an initial racing line, are determined for input into the racing line optimization calculation in a determination operation 608. Any racing line values may be used for input, for example, a previously calculated optimal racing line for the track, a racing line hand-drawn by a designer, or a racing line previously constructed using any of the techniques described herein. In the absence of any previously-defined base line, the centerline of the track may also be used in which all initial values of "free" $\chi$ are zero. The pinned values at a waypoint will be offset from the corresponding positional value along the base racing line (unless a manually pinned value happens to coincide with the base racing line value at the particular waypoint).

As discussed above, for purposes of calculation of a racing line for a known race track, the $\chi$ value of a particular pin point is the only necessary variable to determine. Thus, the $\chi$ values of each pinned point are output from the pin specification system 600 as a pinned value data set 610. Likewise, the $\chi$ values of each of the "free" waypoint measurements of the base racing line are output from the determination operation 608 as a free value data set 612. In a combination operation 614, the pinned $\chi$ values and the free $\chi$ values are combined into a single data set for optimization of a racing line.

The combined data set of $\chi$ values is passed for calculation by both an error function and a gradient function. An error function operation 616 uses the combined data set of $\chi$ values as well as a track data set 622 of values describing the race track centerline and the normal vectors u and v at the centerpoints at the intersection of the centerline with each waypoint. The error function operation 616 uses a common mathematical processing application, for example, MATLAB software, to calculate the results of equation (33) or (34), whichever is used.

Similarly, a gradient function operation 618 uses the combined data set of $\chi$ values as well as a track data set 622 of values describing the race track centerline and the normal vectors u and v at the centerpoints at the intersection of the centerline with each waypoint. The gradient function operation 618 uses a common mathematical processing application, for example, MATLAB software, to calculate the derivatives of equations (33) or (34), whichever is used.

The results of both the error function operation 616 and the gradient function operation 618 are passed to an optimizer operation 620, which optimizes the gradient calculation. As previously described, the optimizer operation 620 may be performed by an off-the-shelf gradient calculation tool, for example, the "scaled conjugate gradients" routine from the NETLAB software toolbox. Alternately, other non-gradient-based optimization routines (e.g., "simulated annealing") could be applied once a numerical approximation for the curvature function is obtained. The initial output of the optimizer operation 620 is returned to replace the free value data set 612 of $\chi$ values by an iteration operation 624. The revised free value data set 612 is recombined with the pinned value data set 610 and reprocessed by the error function operation 616, the gradient function operation 618, and the optimizer operation 620 until the optimizer operation 620 converges and a final set of $\chi$ values are output.

For such a nonlinear optimization, the iteration operation 620 may terminate when an appropriate numerical "convergence" criterion is satisfied indicating that the function is sufficiently close to optimum. Such a criterion may be for example, when the gradient function is near zero (e.g., less than $10^{-6}$), and/or when the error function does not change significantly (e.g., by less than $10^{-6}$) from one iteration to the next, and/or when the optimization variables ($\chi$) themselves do not change significantly from one iteration to the next (e.g., the largest change of any individual $\chi$ is less than 0.0001)

The "optimal" free value data set 626 of $\chi$ values ultimately output by the optimizer operation 620 is input into a line reconstruction operation 628. The track data set 622 of values describing the race track centerline and the normal vectors u and v is also input into the line reconstruction operation 628. The line reconstruction operation 628 then uses these two data sets to develop a complete data set 630 defining a new, optimized racing line that incorporates all of the pinned points required by the pin specification system. The complete data set 630 corresponds to a position on the track at each waypoint through which the racing line passes, i.e., to which the curve of the racing line is fitted.

Figure 7:
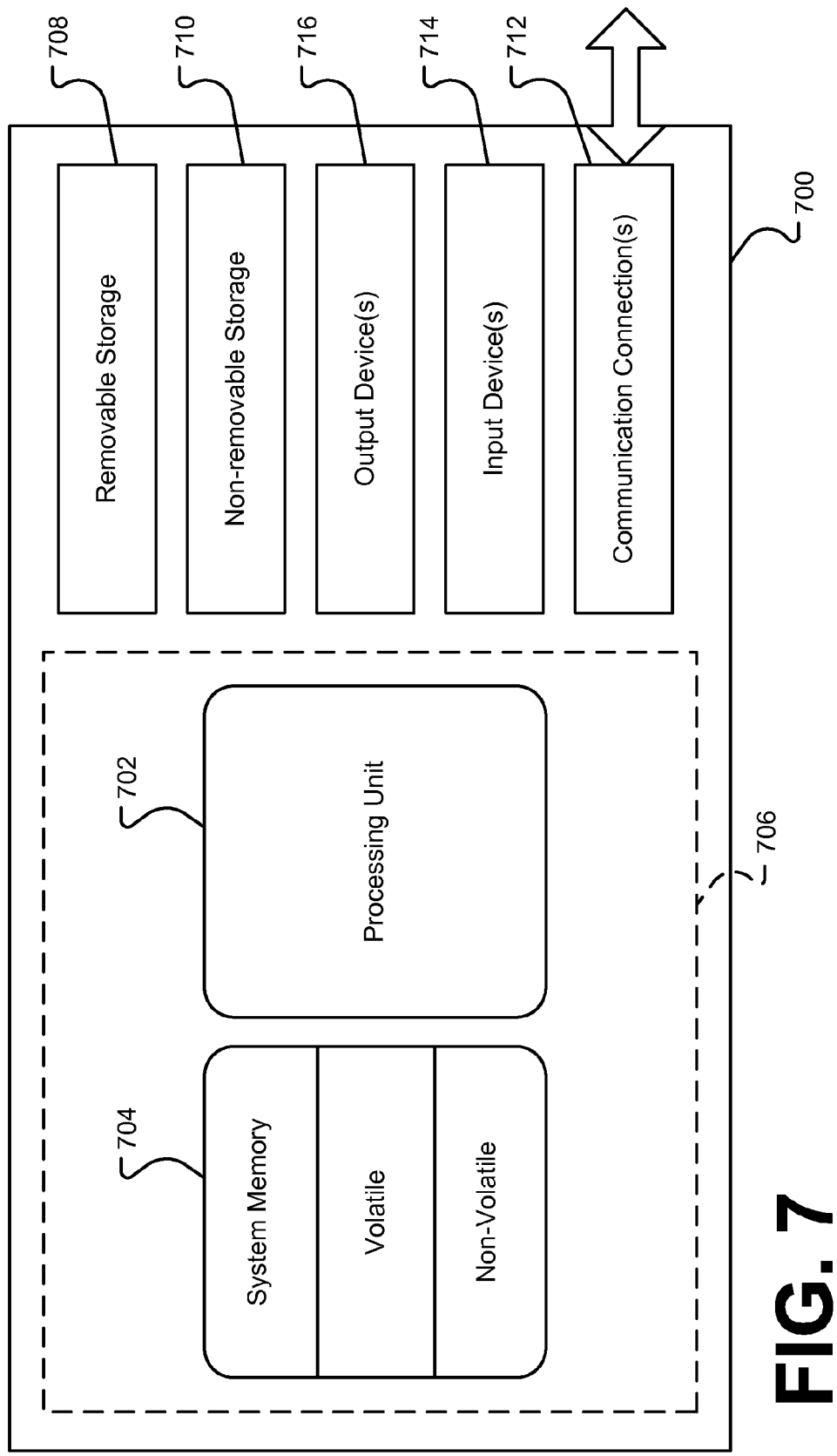
FIG. 7 is a schematic diagram of an exemplary computer system for designing racing lines.

FIG. 7 illustrates an exemplary computer system 700 for calculating racing lines as described herein. In one implementation, the computer system 700 may be embodied by a desktop computer, laptop computer, or application server computer, although other implementations, for example, video game consoles, set top boxes, portable gaming systems, personal digital assistants, and mobile phones may incorporate the described technology. The computer system 700 typically includes at least one processing unit 702 and memory 704. Depending upon the exact configuration and type of the computer system 700, the memory 704 may be volatile (e.g., RAM), non-volatile (e.g., ROM and flash memory), or some combination of both. The most basic configuration of the computer system 700 need include only the processing unit 702 and the memory 704 as indicated by the dashed line 706.

The computer system 700 may further include additional devices for memory storage or retrieval. These devices may be removable storage devices 708 or non-removable storage devices 710, for example, magnetic disk drives, magnetic tape drives, and optical drives for memory storage and retrieval on magnetic and optical media. Storage media may include volatile and nonvolatile media, both removable and non-removable, and may be provided in any of a number of configurations, for example, RAM, ROM, EEPROM, flash memory, CD-ROM, DVD, or other optical storage medium, magnetic cassettes, magnetic tape, magnetic disk, or other magnetic storage device, or any other memory technology or medium that can be used to store data and can be accessed by the processing unit 702. Information, for example, pinned, free, or optimal $\chi$ values and complete racing line data sets, may be stored on the storage media using any method or technology for storage of data, for example, computer readable instructions, data structures, and program modules.

The computer system 700 may also have one or more communication interfaces 712 that allow the system 700 to communicate with other devices. The communication interface 712 may be connected with network. The network may be a local area network (LAN), a wide area network (WAN), a telephony network, a cable network, an optical network, the Internet, a direct wired connection, a wireless network, e.g., radio frequency, infrared, microwave, or acoustic, or other networks enabling the transfer of data between devices. Data is generally transmitted to and from the communication interface 712 over the network via a modulated data signal, e.g., a carrier wave or other transport medium. A modulated data signal is an electromagnetic signal with characteristics that can be set or changed in such a manner as to encode data within the signal.

In some implementations, articles of manufacture, for example, a racing line design tool, are provided as computer program products. One implementation of a computer program product provides a computer program storage medium readable by the computer system 700 and encoding a computer program. Another implementation of a computer program product may be provided in a computer data signal embodied in a carrier wave by the computer system 700 and encoding the computer program.

The computer system 700 may further have a variety of input devices 714 and output devices 716. Exemplary input devices 714 may include a keyboard, a mouse, a tablet, a touch screen device, a scanner, a visual input device, and a microphone or other sound input device. Exemplary output devices 716 may include a display monitor, a printer, and speakers. Such input devices 714 and output devices 716 may be integrated with the computer system 700 or they may be connected to the computer system 700 via wires or wirelessly, e.g., via a BLUETOOTH protocol. These integrated or peripheral input and output devices are generally well known and are not further discussed herein. In one implementation, program instructions implementing the methods or the modules for calculating racing lines or implementing design tools for determining pinned points, are embodied in the memory 704 and storage devices 708 and 710 and executed by processing unit 702. Other functions, for example, handling network communication transactions, may be performed by an operating system in the nonvolatile memory 704 of the computer system 700.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understand that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. In a computing system comprising a processing unit and storage, a method for optimizing a path of a racing line along a track, the method being implemented by executing via the processing unit instructions stored in the storage, the method comprising:
    deriving, by executing instructions via the processing unit, a function of curvature of a base racing line along the track;
    deriving, by executing instructions via the processing unit, a function for lap time following the base racing line along a section of the track;
    substituting, by executing instructions via the processing unit, the function of curvature into the function for lap time;
    introducing, by executing instructions via the processing unit, a pin point on the track;
    minimizing, by executing instructions via the processing unit, the function for lap time including the function for curvature, the minimizing operation comprising constraining an optimizing operation to force the racing line to pass through the pin point; and
    constructing, by executing instructions via the processing unit a racing line based upon output of the minimizing operation.

2. The method of claim 1, wherein the minimizing operation further comprises:
    determining, by executing instructions via the processing unit, a numerical approximation for a position of the base racing line at discrete waypoints along the track;
    determining, by executing instructions via the processing unit, a numerical approximation for the function of curvature based upon the numerical approximation of position at each of the waypoints along the track; and
    processing, by executing instructions via the processing unit, the numerical approximation of curvature with the optimizing operation.

3. The method of claim 2, further comprising iterating, by executing instructions via the processing unit, through the processing operation by substituting values output by the minimizing operation for the numerical approximations of position.

4. The method of claim 2, further comprising representing, by executing instructions via the processing unit, the position of the base racing line at each discrete waypoint as a normal offset from a centerline of the track at each discrete waypoint.

5. The method of claim 1, wherein performing of the introducing operation is selected from the group consisting of (a) manual, (b) automatic and deterministic, and (c) automatic and random.

6. The method claim 1, further comprising confining, by executing instructions via the processing unit, the racing line within an outer edge and an inner edge of the track.

7. The method of claim 1, wherein the introducing step is performed, by executing instructions via the processing unit, at a chosen place, the chosen place selected from the group consisting of a corner entry, a corner exit, and a corner apex.

8. The method of claim 7, wherein the introducing step includes one or more of:
    randomly sampling, by executing instructions via the processing unit, an offset at the chosen place, and
    introducing, by executing instructions via the processing unit, a deterministic offset at the chosen place.

9. A computer readable storage device readable by a computing system and encoding a computer program comprising computer executable instructions which, when executed by at least one processing unit, cause the at least one processing unit to implement the method of claim 1.

10. In a computing system comprising a processing unit and storage, a method for optimizing a path of a racing line along a track, the method being implemented by executing via the processing unit instructions stored in the storage, the method comprising:
    computing, by executing instructions via the processing unit, discrete positions of a base racing line of the track at a series of waypoints in terms of a single variable, the single variable with respect to a centerline of the track;
    determining; by executing instructions via the processing unit, a numerical approximation for curvature of the base racing line at each of the waypoints as a function of the single variable;
    processing, by executing instructions via the processing unit, the numerical approximation with an optimizer, resulting in values for the single variable; and
    construction, by executing instructions via the processing unit, an optimal racing line using the values for the single variable.

11. The method of claim 10, wherein the single variable defines a distance from the centerline of the track.

12. The method of claim 10, further comprising:
    introducing, by executing instructions via the processing unit, a pin point on the track; and
    constraining, by executing instructions via the processing unit, the optimizer to force the optimal racing line to pass through the pin point.

13. The method of claim 12, wherein performing of the introducing step is selected from the group consisting of (a) manual, (b) automatic and deterministic, and (c) automatic and random.

14. The method of claim 12, wherein the introducing step is performed, by executing instructions via the processing unit, at a chosen place, the chosen place selected from the group consisting of a corner entry, a corner exit, and a corner apex.

15. The method of claim 14, wherein the introducing step includes randomly sampling, by executing instructions via the processing unit, an offset at the chosen place.

16. The method of claim 14, wherein the introducing step includes introducing, by executing instructions via the processing unit, a deterministic offset at the chosen place.

17. The method of claim 14, wherein the optimizer comprises a simulated annealing optimizer.

18. A computer readable storage device readable by a computing system and encoding a computer program comprising computer executable instructions which, when executed by at least one processing unit, cause the at least one processing unit to implement the method of claim 10.

19. In a computing system comprising a processing unit and storage, a method for optimizing a racing line along a track, the method being implemented by executing via the processing unit instructions stored in the storage, the method comprising:

processing, by executing instructions via the processing unit, a free value data set with an optimizer operation to result in numerical approximations for the values for the free value data set, the free value data set in terms of a single variable with respect to a centerline of the track at a corresponding waypoint; and storing, by executing instructions via the processing unit, discrete positions of a racing line in terms of the single variable in a memory, the discrete positions comprising the numerical approximations for the free value data set.

20. The method of claim 19, wherein the optimizer operation is constrained, by executing instructions via the processing unit, by one or more pinned points, each of the one or more pinned points corresponding to discrete positions of the racing line.

21. The method of claim 20, the discrete positions further comprising the one or more pinned points.

22. The method of claim 20, wherein the processing comprises calculating, by executing instructions via the processing unit, the numerical approximations for the values for the free value data set based on both the free value data set and the pinned points.

23. A system for reconstructing a racing line along a track, the system comprising:

a memory that stores discrete positions of the racing line along the track in terms of a single variable, each of the discrete positions corresponding to a position at a waypoint of a series of waypoints along the track, the single variable with respect to a centerline of the track at the corresponding waypoint; and a line reconstruction module adapted to construct the racing line using the discrete positions stored in the memory in terms of the single variable.

24. The system of claim 23, wherein the stored discrete positions of the racing line consists of values corresponding to a free value data set.

25. The system of claim 23, wherein the stored discrete positions of the racing line comprises values corresponding to a free value data set and values corresponding to pinned points.

26. A system for optimizing a path of a racing line along a track, the system comprising:

one or more memory;

one or more interconnected modules, the one or more interconnected modules configured to implement operations, the operations comprising:

deriving a function of curvature of a base racing line along the track;

deriving a function for lap time following the base racing line of along a section of the track;

substituting the function of curvature into the function for lap time;

storing a pin point on the track in at least a first of the one or more memory;

minimizing the function for lap time including the function for curvature, the minimizing operation comprising constraining an optimizing operation to force the racing line to pass through the pin point; and constructing a racing line based upon output of the minimizing operation.

* * * * *